(12) United States Patent
Sugata

(10) Patent No.: US 6,798,900 B1
(45) Date of Patent: *Sep. 28, 2004

(54) PAPER SHEET IDENTIFICATION METHOD AND APPARATUS

(75) Inventor: Masanori Sugata, Namegawa-Machi (JP)

(73) Assignee: Nippon Conlux Co., Ltd., Tokyo (JP)

( * ) Notice: Subject to any disclaimer, the term of this patent is extended or adjusted under 35 U.S.C. 154(b) by 399 days.

This patent is subject to a terminal disclaimer.

(21) Appl. No.: 09/699,070

(22) Filed: Oct. 27, 2000

(30) Foreign Application Priority Data

Oct. 29, 1999 (JP) ............................................. 11/309170

(51) Int. Cl.[7] ................................................. G06K 9/00
(52) U.S. Cl. ........................... 382/137; 356/71; 194/207
(58) Field of Search ................................... 382/100, 274, 382/135, 136, 137, 138, 139, 140, 170, 159, 175, 180, 190, 194, 168, 166, 167; 356/71; 209/534, 546, 548; 194/206, 207; 235/379; 250/201.7; 902/7

(56) References Cited

U.S. PATENT DOCUMENTS 4,464,786 A * 8/1984 Nishito et al. .............. 382/135
4,464,787 A * 8/1984 Fish et al. .................. 382/135
5,909,503 A * 6/1999 Graves et al. ............... 382/135
6,050,387 A * 4/2000 Iwaki .......................... 194/207
6,272,245 B1 * 8/2001 Lin ............................. 382/195
6,370,271 B2 * 4/2002 Fu et al. ..................... 382/217
6,470,093 B2 * 10/2002 Liang ......................... 382/135

* cited by examiner

Primary Examiner—Bhavesh M. Mehta
Assistant Examiner—Seyed Azarian
(74) Attorney, Agent, or Firm—Koda & Androlia

(57) ABSTRACT

An identification method and apparatus for paper sheet statistically process information representing characteristics of a bank note, condense these to a smaller number of characteristics, and determine the authenticity of the bank note by using these characteristics. The method for identifying a paper sheet comprises separately carrying out (a) a detecting step and (b) a processing step, which are described below, for a genuine paper sheet note and a paper sheet to be checked, creating reference data based on the detecting step and the processing step carried out for the genuine note, and deter the authenticity of the paper sheet to be checked by comparing the data detected therefrom with the reference data. The identification apparatus for paper sheet, comprises signal creating units D, LD, PD, IV, AD and M, which create a plurality of pattern signals to be checked for a plurality of physical characteristics representing a pattern which is printed on the paper sheet in a predetermined region thereof; a processing unit J1; and a reference data storing unit R and a determining unit J2.

4 Claims, 2 Drawing Sheets

PAPER SHEET IDENTIFICATION METHOD AND APPARATUS

BACKGROUND OF THE INVENTION

1. Field of the Invention

The present invention relates to a method and apparatus for identifying paper sheets such as bank notes by using optical characteristics to determine the authenticity of the paper sheets. In particular, this invention relates to the method and apparatus which identify paper sheets by using physical characteristics such as optical characteristics to detect a pattern printed on the paper sheets.

2. Description of the Related Art

Bank notes are a typical example of paper sheets, and authentication thereof is widespread. For example, light is radiated onto a predetermined region of the bank note while the bank note is being carried along a carrying path. The permeated light and reflected light are detected, and a signal relating to the density of a pattern printed on the bank note is extracted. The extracted signal is compared with a reference signal to determine the authenticity of the bank note.

Optical detection methods basically use a single wavelength, but cannot easily identify skillful forgeries. The density information is read at a single wavelength, and is detected by using a method which tolerates fluctuating levels of the detector and the light source, discrepancies in the printing and finish of the bank notes, and dirty bank notes. As a consequence, this method overlooks bank notes which are fairly skillfully forged and determines that they are authentic.

This problem is solved by extracting separate density information using lights of at least two wavelengths, e.g. red light and infrared light, and combining these to increase precision.

However, when two or more beams of light are used, the amount of data increases, making high-speed processing impossible. Further, the identification threshold of the individual data must be widened in order to tolerate a certain degree of variation in the genuine bank notes. This makes highly precise identification difficult to achieve.

SUMMARY OF THE INVENTION

The present invention has been achieved in order to solve the above problems. It is an object of this invention to provide an identification method and apparatus for authenticating paper sheets by statistically processing information representing characteristics of bank notes, condensing the information into a small number of characteristics which are used to determine authenticity.

In order to achieve the objects described above, the present invention provides a method for identifying a paper sheet comprising separately carrying out (a) a detecting step and (b) a processing step, which are described below, for a genuine paper sheet note and a paper sheet to be checked, creating reference data based on the detecting step and the processing step carried out for the genuine note, and determining the authenticity of the paper sheet to be checked by comparing the data detected therefrom with the reference data. (a) a detecting step of detecting a plurality of pattern signals to be checked of a plurality of physical characteristics representing a pattern which is printed on the paper sheet in a predetermined region thereof. (b) a processing step of determining mutually varying contents of the plurality of patterns to be checked; and an identification apparatus for paper sheet, comprising a signal creating unit which creates a plurality of pattern signals to be checked for a plurality of physical characteristics representing a pattern which is printed on the paper sheet in a predetermined region thereof; a processing unit which determines mutually varying contents of the plurality of patterns to be checked; a reference data storing unit which stores a pattern signal to be checked, extracted by the signal creating unit from the genuine paper sheet note, as reference data; a calculating unit which compares the reference data from the reference data storing unit with variation contents based on the pattern signal to be checked which was extracted from the paper sheet to be checked, and calculates the difference therebetween; and a determining unit which determines whether the difference calculated by the calculating unit is within a tolerance range.

PREFERRED EMBODIMENTS

Figure 1:
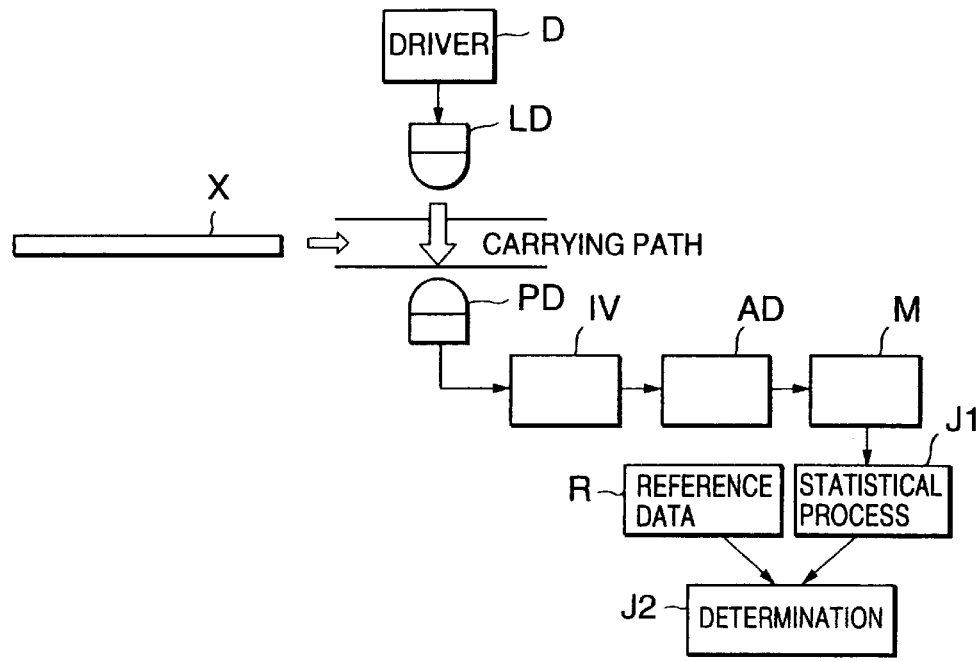
FIG. 1 is a block diagram showing the constitution of an embodiment of this invention.

FIG. 1 shows the constitution of an embodiment of the present invention. A paper sheet X is being carried along a carrying path. A two-color light-emitting diode LD is driven by current from a driver D and emits lights of two colors. When the paper sheet X reaches a predetermined position on the carrying path, the two-color light-emitting diode LD radiates the lights of two colors in a time-sharing sequence.

A photodetector PD detects the light components which have permeated the predetermined region of the paper sheet X. A current-voltage converter IV voltage-converts the current detected by the photodetector PD, and an analog-digital converter AD converts the result to digital data which is stored in a memory M. The data collecting section from the photodetector PD to the memory M is switched in a time-sharing sequence each time the two-color light-emitting diode LD emits light between the light detection and the data storage.

A CPU processes the data which was obtained in this way. Firstly, the CPU performs a statistical process J1 by selecting data of a check target region in the data from the memory M as pre-processing for a subsequent determination process J2 using reference data R.

Figure 2:
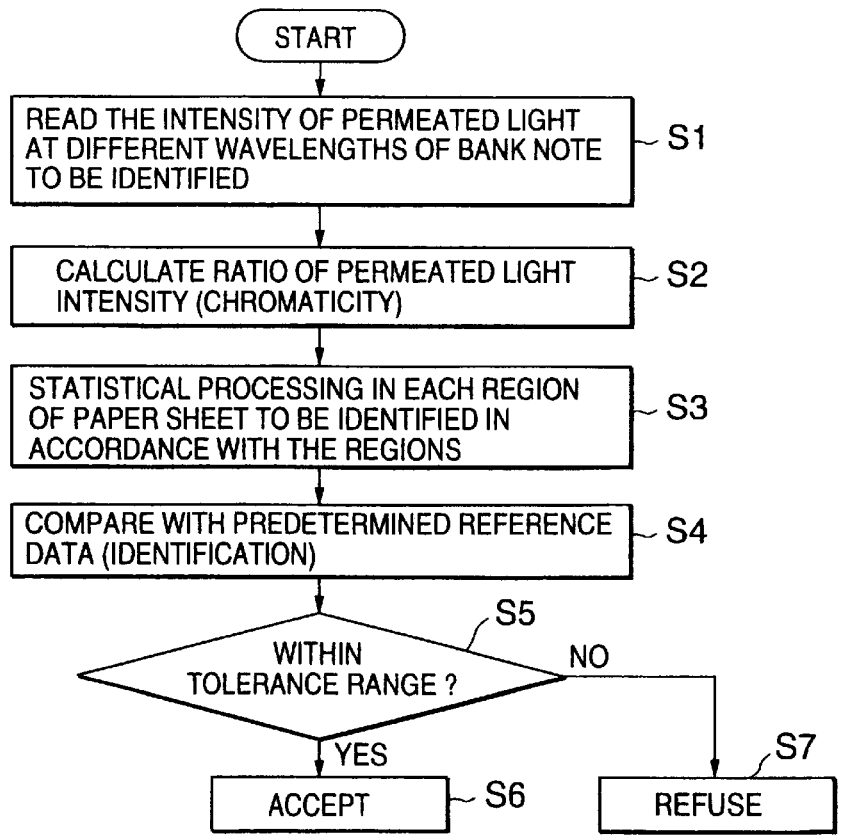
FIG. 2 is a flowchart showing operation contents of the embodiment of FIG. 1.

FIG. 2 is a flowchart showing operations of data collection and data processing performed by the constitution shown in FIG. 1.

When the apparatus starts operating, data representing the intensity of the permeated light at each wavelength of the lights which were radiated onto the target paper sheet is read by the constitution from the photodetector PD to the memory M in a step S1. The data is collected is this way.

The CPU reads the data from the memory M and uses it to calculate the ratio of intensity between the two permeated lights (step S2). The ratio of intensity of the permeated lights can be expressed as the ratio of chromaticity (hue+ brightness). In the case of the embodiment of FIG. 1, the difference between the intensity of light at a certain wavelength and the intensity of light at another wavelength is expressed as a ratio, and consequently expresses the coloring of the bank note.

The chromaticity is different in each region of the bank note, being divided into regions having low changes in color and regions having large changes in color. Therefore, when the regions are appropriately set, it is possible to obtain a characteristic which is suitable for authenticating the bank note by using the chromaticity as a reference. The regions are set in advance so that the stipulated characteristic of each type of bank note can be used.

In step S3, each region is statistically processed based on the set regions. Statistical processing comprises, for example, determining an average value for regions of the bank note having low changes in chromaticity, and determining maximum and minimum values for regions having large changes in chromaticity. Such a computation calculates the amount of characteristics from the collected data.

The characteristics calculated in this data processing are compared with the predetermined reference data, and the difference therebetween is determined (step S4). Subsequently, it is determined whether this difference is less than a tolerance value (step S5). When the difference is less than the tolerance value, the bank note is determined to be genuine and the processing proceeds to step S6, in which the bank note is accepted. On the other hand, when the difference exceeds the tolerance value, the bank note is determined to be a forgery and the processing proceeds to step S7, in which the bank note is refused.

Figure 3:
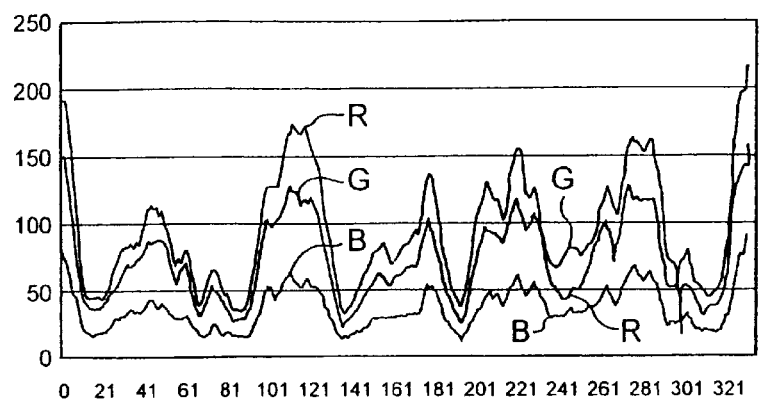
FIG. 3 is a characteristics diagram showing measurements of the intensity of three permeated lights (red, green and blue) from one end of a paper sheet to the other end.

FIG. 3 shows data for each color, obtained by measuring changes in light which is permeated when lights of three colors (red, blue and green) are radiated onto a US dollar bill. The horizontal axis numerically represents the position along the length of the bank note between a threshold 1 and 321 (+), and the vertical axis numerically represents the intensity level of the permeated light between zero and 250. Codes are appended to each measurement curve, R representing red, G representing green, and B representing blue. Although the complex lines of the curves in FIG. 3 make it rather difficult to perceive clearly, the overall levels of red R, green G and blue B decrease in that order, except near the position 241.

Figure 4:
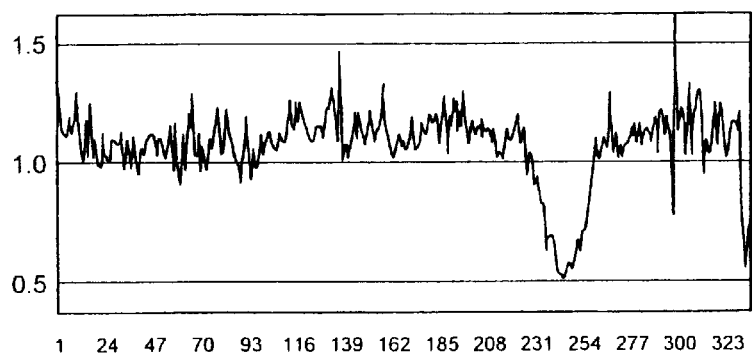
FIG. 4 is a characteristics diagram showing the distribution ratio of red and green from the measurements of FIG. 3.

FIG. 4 shows changes in the intensity ratio of the permeated light (R/G) between the red R and green G of FIG. 3. As in FIG. 3, FIG. 4 reveals a large change near the position 241, but otherwise the ratio remains constant apart from very minor fluctuations. The level at the position 241 is approximately 0.5, but the level at other positions is close to 1.0. This signifies that there is a characteristic portion of a pattern near the position 241 on the bank note. Therefore, the bank note can be authenticated by determining whether the changes in the R/G value near the position 241 are correct or not.

The R/G value reaches its maximum near the position 1, and reaches its minimum at the position 323. These should be ignored, since the maximum and minimum values have no connection to the pattern printed at the end of the bank note.

FIG. 3 uses the R/G ratio since red is the color which changes most markedly, but the results are not much different when the R/B ratio is used. By contrast, when red is excluded and the ratio between green and blue is used, it becomes difficult to accurately detect the characteristic point.

Figure 5:
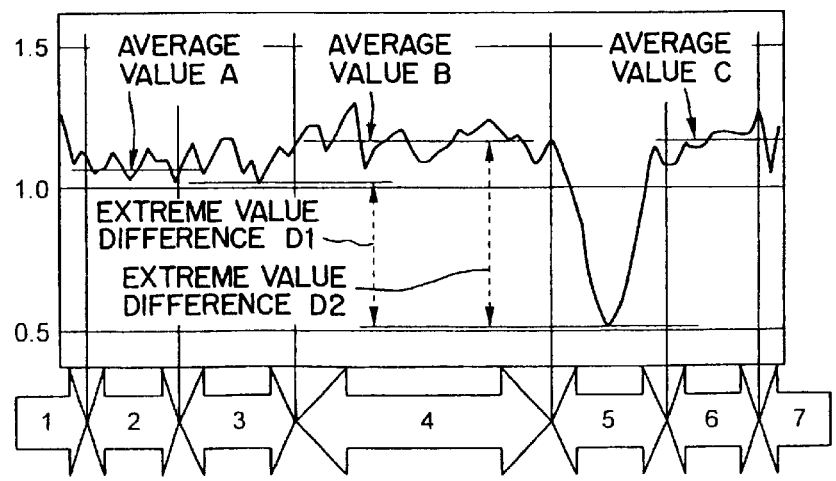
FIG. 5 is a diagram showing a way of filtering the red and green ratio distribution of FIG. 4, and setting regions containing the characteristic points.

FIG. 5 shows a filtered version of the R/G values shown in FIG. 4, wherein the very minor fluctuations have been removed, and seven regions which are set based on the changes in the R/G value. Region 5 contains the characteristic pattern shown as position 241 in FIGS. 3 and 4. Regions 1 and 7 are the end regions, and are not included in the check.

The regions 2, 3, 4 and 6 have average R/G values close to approximately 1.0, and do not contain the characteristic pattern. When these average values are expressed as A, B and C, and the differences between these values and the minimum value in the region 5 are expressed as extreme value differences D1 and D2, D1 and D2 are between 0.5 to 0.6, clearly indicating the characteristic nature of the region 5.

As already mentioned, the data extracted from the characteristic region 5 is compared with reference data, extracted in advance from a suitable number of genuine bills, and the authenticity of the bank note is determined based on the degree of difference therebetween.

Modifications

Permeated light is detected in the embodiment described above, but authenticity may be checked by using light which has been reflected from the surface of the paper sheet. In this case, the characteristic point is not always the same as when using permeated light and the set regions do not necessarily match.

In the embodiment described above, only an optical check using two wavelengths was carried out by using a two-color LED and a light-receiving diode, but it is acceptable to use one optical sensor and one magnetic sensor and to combine their detected outputs. In this case also, the set regions may differ from those shown in FIG. 5, since the optical characteristic point will not necessarily match the magnetic characteristic point.

The above embodiment was used to identify bank notes, but this invention can be applied to goldnotes, coupons, and the like.

TECHNICAL ADVANTAGES

As described above, this invention measures multiple physical characteristics of a paper sheet, determines the variation between them, and determines the authenticity of the paper sheet based on whether the variation is within the tolerance range of reference data. The amount of data which is handled can be limited as appropriate by selecting a region in which the multiple physical characteristics are likely to vary. Therefore, the paper sheet can be authenticated by handling a comparatively small amount of data.

Since the amount of data is small, the process can be performed at high-speed.

In particular, when optical measurements of two wavelengths are used, even a skillful forgery having a pattern with the correct density information can be clearly distinguished from the measurement data of a genuine note.

Further, when optical and magnetic measurements are used jointly, the characteristics can be detected even more clearly than by using only optical detection.

What is claimed is:

1. A method for identify a paper sheet, comprising:
    collecting data of a plurality of scientific characteristics from a plurality of predetermined regions of the paper sheet;
    calculating the ratios between the data;
    determining an averaged value in a partial region where the change of the ratios is small, and determining a maximal or minimal value in a partial region where the change of the ratios is large;

obtaining the difference between the averaged value and the maximal or minimal value; and comparing the difference with a reference value so as to determine if the difference falls within a tolerable range.

2. An apparatus for identifying a paper sheet, comprising:

means for collecting data of a plurality of scientific characteristics from a plurality of predetermined regions of the paper sheet;

means for calculating the ratios between the data;

means for determining an averaged value in a partial region where the change of the ratios is small, and determining a maximal or minimal value in a partial region where the change of the ratios is large;

means for obtaining the difference between the averaged value and the maximal or minimal value; and means for comparing the difference with a reference value so as to determine if the difference falls within a tolerable range.

3. The identification apparatus for paper sheet as described in claim 2, said plurality of physical characteristics comprising a plurality of optical characteristics extracted from said paper sheet by using lights having a plurality of wavelengths.

4. The identification apparatus for paper sheet as described in claim 2, said plurality of physical characteristics comprising at least one optical careerists extracted from said paper sheet by using light, and at least one magnetic characteristic extracted from said paper sheet by using magnetism.

* * * * *